(12) United States Patent
Childers et al.

(10) Patent No.: US 7,347,090 B1
(45) Date of Patent: Mar. 25, 2008

(54) METHODS AND SYSTEMS FOR CALCULATING ATMOSPHERIC VEHICLE AIR DATA

(75) Inventors: David G Childers, Long Beach, CA (US); Ashwani K Chaudhary, Cypress, CA (US); Viet H Nguyen, Cerritos, CA (US); David Poladian, Carlsbad, CA (US); Hoi T Tran, Tustin, CA (US); Vincent L Wong, Irvine, CA (US); Michael J Zyss, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/532,027

(22) Filed: Sep. 14, 2006

(51) Int. Cl.
*G06F 19/00* (2006.01)
(52) U.S. Cl. ........................ 73/170.02; 701/4
(58) Field of Classification Search ............. 73/170.02; 701/4; 702/50
See application file for complete search history.

(56) References Cited

U.S. PATENT DOCUMENTS

| | | | |
|---|---|---|---|
| 6,253,166 B1 | 6/2001 | Whitmore et al. | |
| 6,928,341 B2 | 8/2005 | Wise | |
| 2004/0186635 A1* | 9/2004 | Manfred | 701/4 |
| 2006/0212182 A1* | 9/2006 | Shaw | 701/12 |
| 2007/0239326 A1* | 10/2007 | Johnson et al. | 701/9 |

* cited by examiner

*Primary Examiner*—Andre J. Allen
(74) *Attorney, Agent, or Firm*—Lee & Hayes, PLLC

(57) ABSTRACT

Methods and systems for calculating atmospheric vehicle air data are disclosed. In one embodiment, a method of calculating air data includes acquiring one or more pressure measurements at locations on an outer surface of the aircraft; acquiring one or more measurements using an alternate navigation device; computing an indicated air data solution using the one or more measurements obtained using the alternate navigation device and an atmospheric model; computing corrections to the indicated air data solution using one or more other measured parameters, wherein the one or more other measured parameters include at least one of the one or more pressure measurements and the one or more measurements obtained using the alternate navigation device; determining a corrected air data solution using the indicated air data solution and the corrections; and providing the corrected air data solution for use in controlling the aircraft.

20 Claims, 6 Drawing Sheets

METHODS AND SYSTEMS FOR CALCULATING ATMOSPHERIC VEHICLE AIR DATA

STATEMENT OF GOVERNMENT INTEREST

This invention was made with government support under contract number F30602-03-C-2005 awarded by the United States Air Force. The U.S. Government has certain rights in this invention.

FIELD OF THE INVENTION

This invention relates generally to control of flight vehicles, and more specifically, to methods of calculating atmospheric vehicle air data.

BACKGROUND OF THE INVENTION

Flight control and guidance of a vehicle through the atmosphere requires knowledge of the vehicle's motion and attitude relative to the earth's air mass. This knowledge, commonly referred to as "air data," is generally measured using instruments that either protrude into the surrounding airstream, or are flush mounted with an outer surface of the vehicle. Alternately, other instruments may use inertial navigation system (INS) derived values.

Although desirable results have been achieved using such prior art air data systems, there is room for improvement. For example, for high-speed reentry aircraft, the use of instruments that protrude into the airstream is problematic because of the heating that occurs due to the high velocity of the air. The high velocity of a reentry aircraft means the outside surface of the aircraft experiences very high temperatures (e.g. in the 1000s of deg F). Such temperatures may be high enough to melt or break protruding instruments. Deployable probes generally require a considerable amount of calibration, are costly, and require valuable space in the aircraft near the surface to be deployed.

Air data systems that rely on flush-mounted instruments and INS-derived data also have drawbacks. For larger aircraft, flush-mounted pressure taps may be suitably positioned near the stagnation point on a relatively large curved surface. For a smaller aircraft, however, the stagnation point is typically one of the highest heating points on the aircraft, and the temperatures may be so high that flush-mounted instrumentation is impractical because the instrument materials cannot support the heating rate. Air data systems that use INS-derived data are typically too inaccurate for proper control of the reentry aircraft.

Therefore, novel air data systems and methods that provide the required accuracy and that otherwise mitigate the above-noted characteristics of the prior art air data systems would have utility.

SUMMARY OF THE INVENTION

The present invention is directed to methods and systems for calculating atmospheric vehicle air data. Embodiments of the invention may advantageously eliminate the need for expensive, bulky and mechanically deployable air data probes. By using both inertial measurements and pressure measurements, embodiments of the invention may provide a complete air data solution with flexibility in the location of the pressure taps, redundancy management of the measurements, and the ability to operate in the absence of pressure measurements.

In one embodiment, a method of calculating air data used for controlling an aircraft includes acquiring one or more pressure measurements at locations on an outer surface of the aircraft; acquiring one or more measurements using an alternate navigation device; computing an indicated air data solution using the one or more measurements obtained using the alternate navigation device and an atmospheric model; computing corrections to the indicated air data solution using one or more other measured parameters, wherein the one or more other measured parameters include at least one of the one or more pressure measurements and the one or more measurements obtained using the alternate navigation device; determining a corrected air data solution using the indicated air data solution and the corrections; and providing the corrected air data solution for use in controlling the aircraft.

In alternate embodiments, acquiring one or more measurements using an alternate navigation device includes acquiring one or more measurements using at least one of an inertial navigation system, and an aided inertial navigation system aided by a global positioning system. In a further embodiment, computing corrections to the indicated air data solution may include computing corrections to the indicated air data solution using an extended Kalman filter. In still other embodiments, computing an indicated air data solution may be performed at a first frequency, and computing corrections to the indicated air data solution may be performed at a second frequency different from (e.g. less than) the first frequency.

In another embodiment, a system for calculating air data used for controlling an aircraft includes a data acquisition component and a processing component. The data acquisition component includes the first portion configured to acquire one or more pressure measurements at locations on an outer surface of the aircraft, and a second portion configured to acquire one or more measurements using an alternate navigation device. The processing component is configured to receive the measurements from the data acquisition component, and is further configured to compute an indicated air data solution using the one or more measurements obtained using the alternate navigation device and an atmospheric model; compute corrections to the indicated air data solution using one or more other measured parameters, wherein the one or more other measured parameters include the one or more pressure measurements; determine a corrected air data solution using the indicated air data solution and the corrections; and provide the corrected air data solution for use in controlling the aircraft.

In yet another embodiment, one or more computer-readable media comprising computer executable instructions that, when executed, perform a method comprising computing an indicated air data solution using one or more measurements obtained using a navigation device and an atmospheric model; computing corrections to the indicated air data solution using one or more other measured parameters, wherein the one or more other measured parameters include one or more pressure measurements; determining a corrected air data solution using the indicated air data solution and the corrections; and providing the corrected air data solution for use in controlling an aircraft.

BRIEF DESCRIPTION OF THE DRAWINGS

Embodiments of the present invention are described in detail below with reference to the following drawings.

DETAILED DESCRIPTION

The present invention relates to methods and systems for calculating air data of atmospheric vehicles, including vehicle attitude and velocity relative to the atmospheric air mass. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without several of the details described in the following description.

In general, embodiments of the present invention use a software algorithm to combine measurements from an inertial navigation system (INS) with measurements from flush pressure taps to calculate an aircraft's complete air data state with fidelity high enough to support autonomous guidance and control of the aircraft. The positioning of the taps on the aircraft's surface is flexible, allowing them to be positioned away from the stagnation point, in locations convenient for manufacture, and in areas of benign heating in the case of a high speed aircraft, or a reentry spacecraft. The software algorithm and pressure tap design advantageously provides redundancy management to protect the air data outputs from a hardware failure in the avionics devices used for measurements.

Figure 1:
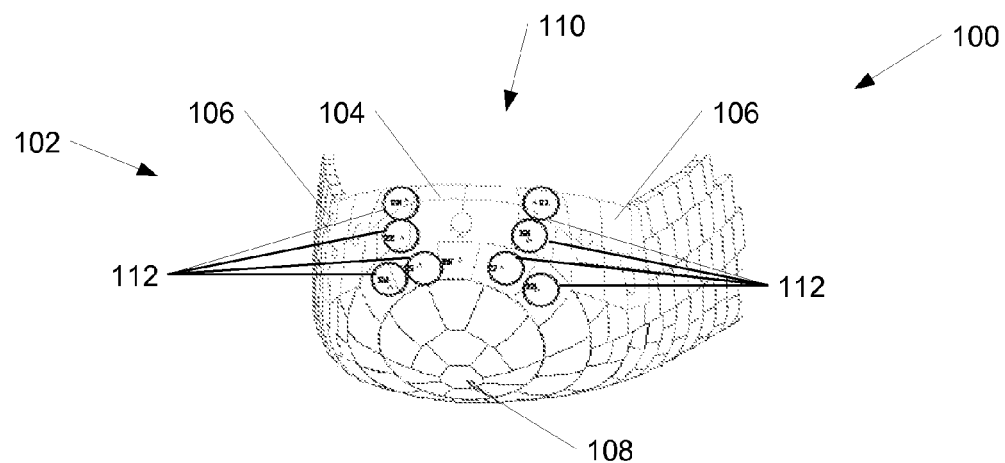
FIG. 1 is an isometric view of a forward portion of a flight vehicle having an air data system in accordance with an embodiment of the invention.
Figure 2:
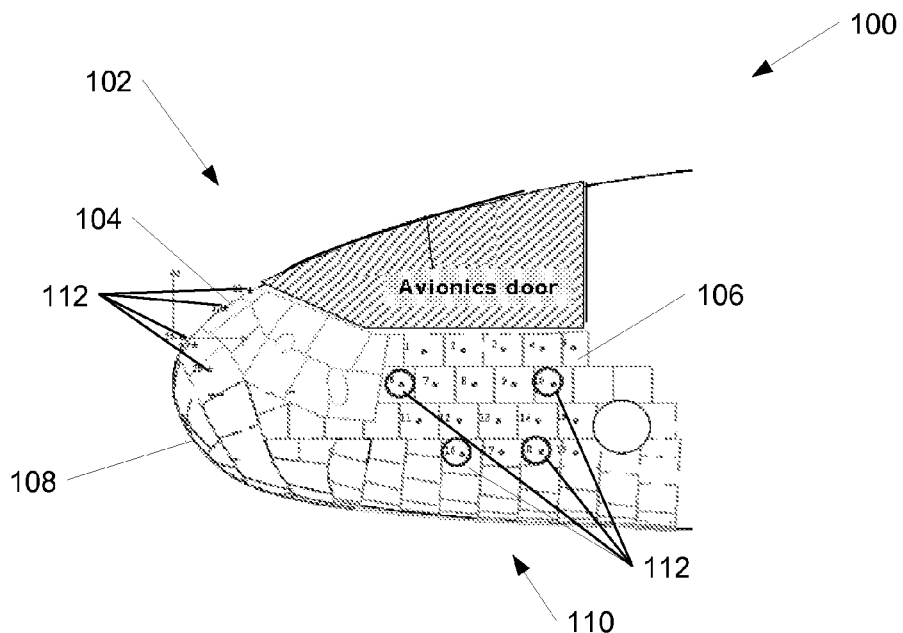
FIG. 2 is a side elevational view of the forward portion of the flight vehicle of FIG. 1.

FIG. 1 is an isometric view of a forward portion 102 of a flight vehicle 100 having an air data system 110 in accordance with an embodiment of the invention. FIG. 2 is a side elevational view of the forward portion 102 of the flight vehicle 100 of FIG. 1. In this embodiment, the forward portion 102 includes an upper surface 104 and lateral surfaces 106. During flight, a freestream airflow forms a stagnation point 108 on the forward portion 102 of the flight vehicle 100.

As further shown in FIGS. 1 and 2, the air data system 110 includes a plurality of pressure taps 112 distributed over the upper and lateral surfaces 104, 106 of the forward portion 102. The pressure taps 112 are non-protruding (e.g. flush mounted) on the surfaces 104, 106, and are spaced apart from an area of extremely high heating surrounding the stagnation point 108 on the forward portion 102. As used in this disclosure, the term "flush" refers to pressure taps that are both flush and approximately flush, including taps that are slightly recessed or slightly protruding, and does not require that the pressure taps be exactly coplanar with the surrounding surfaces 104, 106 in which they are disposed.

Figure 3:
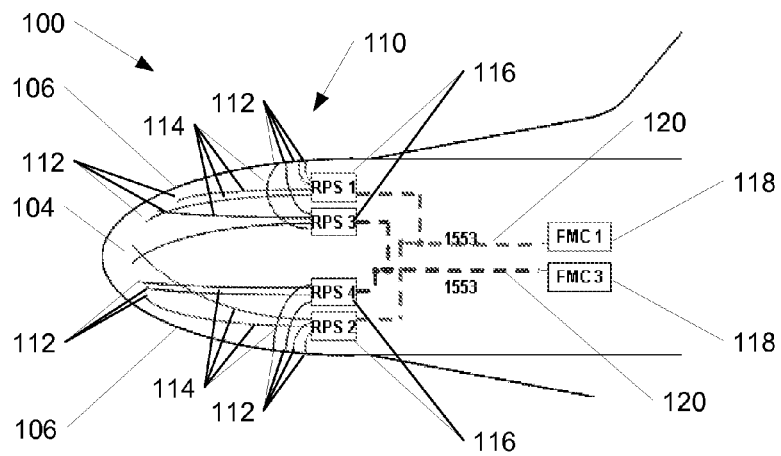
FIG. 3 is a plan, cross-sectional view of the forward portion of the flight vehicle of FIG. 1.

FIG. 3 is a plan, cross-sectional view of the forward portion 102 of the flight vehicle 100 of FIG. 1. As shown in FIG. 3, each of the pressure taps 112 is coupled by a pneumatic tube 114 to a remote pressure sensor (RPS) device 116. The RPS devices 116, in turn, are coupled to one or more processors (or Flight Management Computers) 118. The RPS devices 116 may be coupled to the processors 118 using a communications link 120, such as a 1553 bus or other suitable communication media. In the particular embodiment shown in FIG. 3, the air data system 110 includes four RPS devices 116, and each RPS device 116 is coupled to four pressure taps 112, including a first pair of taps 112 located on the upper surface 104 and a second pair of taps 112 located on a lateral surface 106. Two of the RPS devices 116 are coupled to one processor 118, and the other two RPS devices 116 are coupled to the other processor 118. In this way, the air data system 110 provides a desired degree of redundancy such that a failure of any one component of the system 110 will not disrupt the system's ability to estimate air data.

Figure 4:
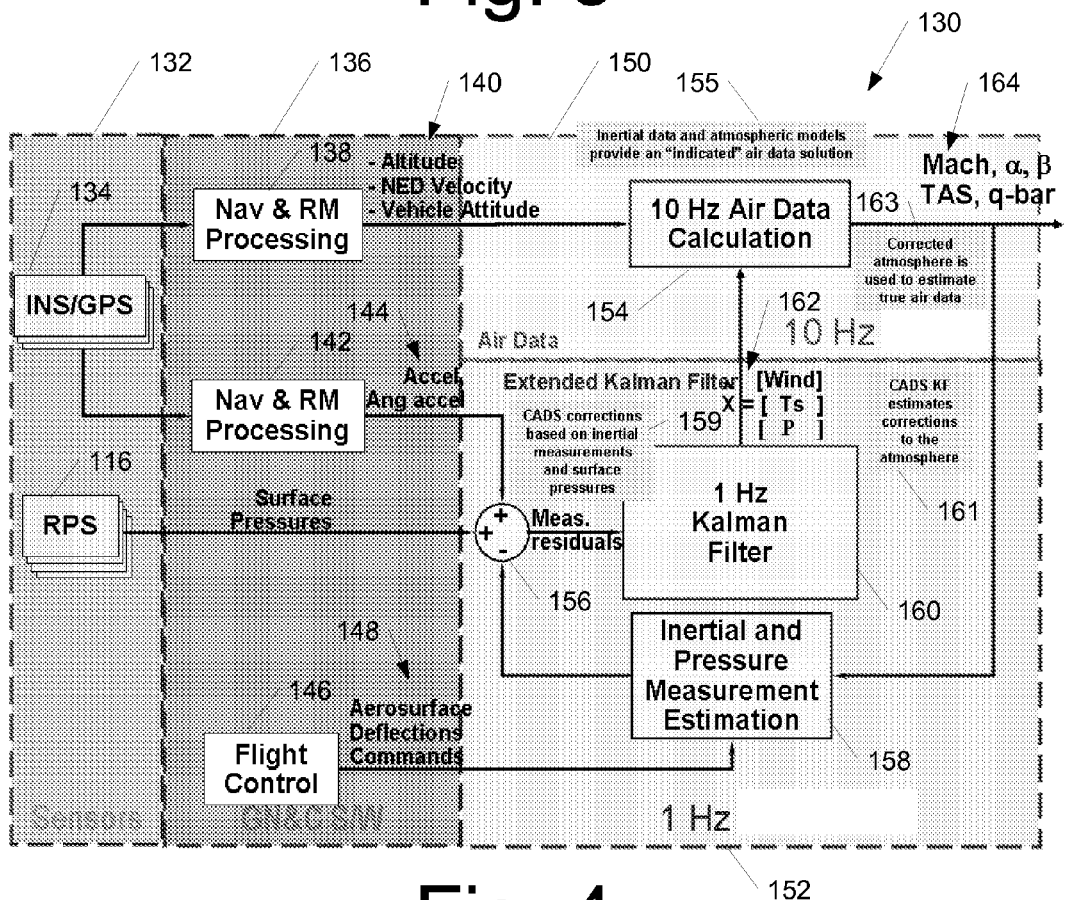
FIG. 4 is a schematic view of a processing portion of an air data system in accordance with an embodiment of the invention.

Additional aspects of the air data system 110 are shown in FIG. 4, which shows a schematic view of a processing portion 130 of the air data system 110. In the following discussion, exemplary methods and processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Furthermore, removal of one or more of the listed operations, or the addition of additional operations, does not depart from the scope of the invention.

As shown in FIG. 4, a sensor portion 132 of the air data system 110 includes the RPS devices 116 as described above, as well as an INS (or a global positioning system aided INS) component 134. Outputs from the sensor portion 132 are received by a control (or Guidance, Navigation, and Control) portion 136, which may include software, hardware, or a combination of hardware and software components. A first component 138 of the control portion 136 receives outputs from the INS component 134 and computes a first set of flight parameters 140, which may include altitude, velocity, and vehicle attitude. Similarly, a second component 142 of the control portion 136 receives outputs from the INS component 134 and computes a second set of flight parameters 144, which may include acceleration and angular acceleration. A third component 146 of the control portion 136, which may be a flight control portion, provides a third set of flight parameters 148, which may include aerosurfaces' deflection commands. Of course, in alternate embodiments, the first, second, and third components 138, 142, 146 may be divided into a greater number of components, or may be combined into fewer components, or even a single component.

As further shown in FIG. 4, the processing portion 130 further includes a first frequency portion 150 and a second frequency portion 152. The first frequency portion 150 may operate at a relatively higher frequency (e.g. 10 Hz) and the second frequency portion 152 may operate at a relatively lower frequency (e.g. 1 Hz). In this embodiment, the second frequency portion 152 comprises an Extended Kalman Filter (EKF), as described more fully below. The EKF is used because of the nonlinear nature of the estimation problem.

In the embodiment shown in FIG. 4, the first set of flight parameters (or first flight characteristics) 140 are received by an air data calculator 154 of the first frequency portion 150. Using the first set of flight parameters 140 and an atmospheric model, the air data calculator 154 provides an "indicated" air data solution (block 155). Similarly, the second set of flight parameters (or second flight characteristics) 144 and the outputs of the RPS devices 116 are received into a corrections module 156. The third set of flight parameters (or third flight characteristics) 148 are received by an estimation module 158, which performs estimates of the second set of flight parameters 144 and the outputs of the RPS devices 116 based on one or more air data characteristics and a vehicle inertial and pressure model. The corrections module 156 receives the output from the estimation module 158, and provides corresponding correction signals based on inertial measurements and surface pressures (block 159) to a Kalman filter 160. Using these inputs, the Kalman filter 160 then estimates corrections to the atmospherically-derived data (block 161), and outputs a set of corrections 162 to the air data calculator 154. The corrections 162 are the first five elements of the EKF state vector. From the first set of flight parameters 140 received from the control portion 136, and the set of corrections 162 from the Kalman filter 160 of the second frequency portion 152, the air data calculator 154 estimates true air data (block 163) and outputs an air data state vector 164.

In general, the air data system 110 provides the air data state vector 164 which describes the state of a flying vehicle relative to the atmosphere's air mass. The information in the air data state vector 164 may include, for example, true air speed, dynamic pressure, Mach number, angle of attack, and angle of sideslip. These air data parameters may be made available at a variety of rates, including at the rate in which the INS 134 provides outputs (e.g. position, velocity and attitude data) to the control portion 136. The air data state vector 164 can then be provided to other computing components of the aircraft, including, for example, components or devices associated with control and guidance of the aircraft.

More specifically, in operation, the air data calculator 154 uses high rate inputs from the INS 134 and an input atmosphere model (or a standard atmosphere) to provide high rate air data parameters (e.g. the air data state vector 164). The EKF (or low frequency portion) 152 estimates current atmospheric parameters such as wind, temperature and density corrections that are fed back to the air data calculator 154 and allow it to provide the current vehicle motion and attitude relative to the atmosphere. The EKF 152 calculates its estimates at the same, or optionally, at a lower rate than the air data calculator 154 based on one or more of the air data calculator outputs, flush pressure measurements, acceleration and angular acceleration measurements from the INS's Inertial Measurement Unit (IMU), and a model of the flush pressure measurements and acceleration and angular acceleration measurements for the vehicle, which is a function of one or more of the air data calculator outputs.

The processing portion 130 of the air data system 110 operates best with all of the pressure measurements, but can operate with some, or even none of the pressure measurements. The hardware and software layout of the components associated with the pressure measurements is designed so that the failure of any one component or subsystem will still provide sufficient pressure measurements to allow full fidelity estimation of the complete air data state. In the case of no pressure measurements, the processing portion 130 of the air data system 110 will provide air data parameters (e.g. the air data state vector 164) whose accuracy has been gracefully degraded.

In one particular embodiment, the EKF state vector 162 consists of 11 elements, as follows:
  1-3. Atmospheric Wind components (2 horizontal, 1 vertical) (which may be modeled as a 1st order Markov process);
  4. Atmospheric Temperature Error relative to standard, or model atmosphere temperature (which may be modeled as a 1st order Markov process);
  5. Atmospheric Density Error relative to standard, or model atmosphere density (which may be modeled as a 1st order Markov process); and
  6-11. Errors in aerodynamic force and moment coefficients, modeled as biases.

In the above-noted EKF state vector 162 embodiment, the Markov states may be modeled in terms of a correlation length as consistent with vehicle motion through the atmosphere. The last 6 states can be configured as consider states, that is, not estimated by the EKF 152, but used for better modeling the covariance of the estimation process, or can be feed back into the EKF estimation algorithm.

In a further embodiment, the EKF measurements may consist of 16 pressure taps 112 and 6 inertial measurements. The 16 pressure taps 112 are shown in FIGS. 1 through 3. The 6 inertial measurements provided by the vehicle's IMU 134 may be three body frame sensed accelerations, and three body frame angular accelerations. As shown in FIG. 4, the air data calculations may generally run at a 10 hz rate, and the EKF 152 may run at a 1 hz rate. Of course, in alternate embodiments, other rates of the first and second frequency portions 150, 152 may be used, including embodiments wherein the first frequency portion 150 may operate at a higher rate than 10 Hz and, or wherein the first and second frequency portions 150, 152 may operate at the same rate. It will be appreciated that, following the path of the outputs of the INS 134 along the top of FIG. 4, the output of the first frequency portion 150 (e.g. 10 Hz air data parameters) does not require the second frequency portion (or EKF) 152 to be providing input to the air data calculator 154, and therefore, the air data calculation from the air data system 110 is resilient to loss of EKF measurements.

Figure 5:
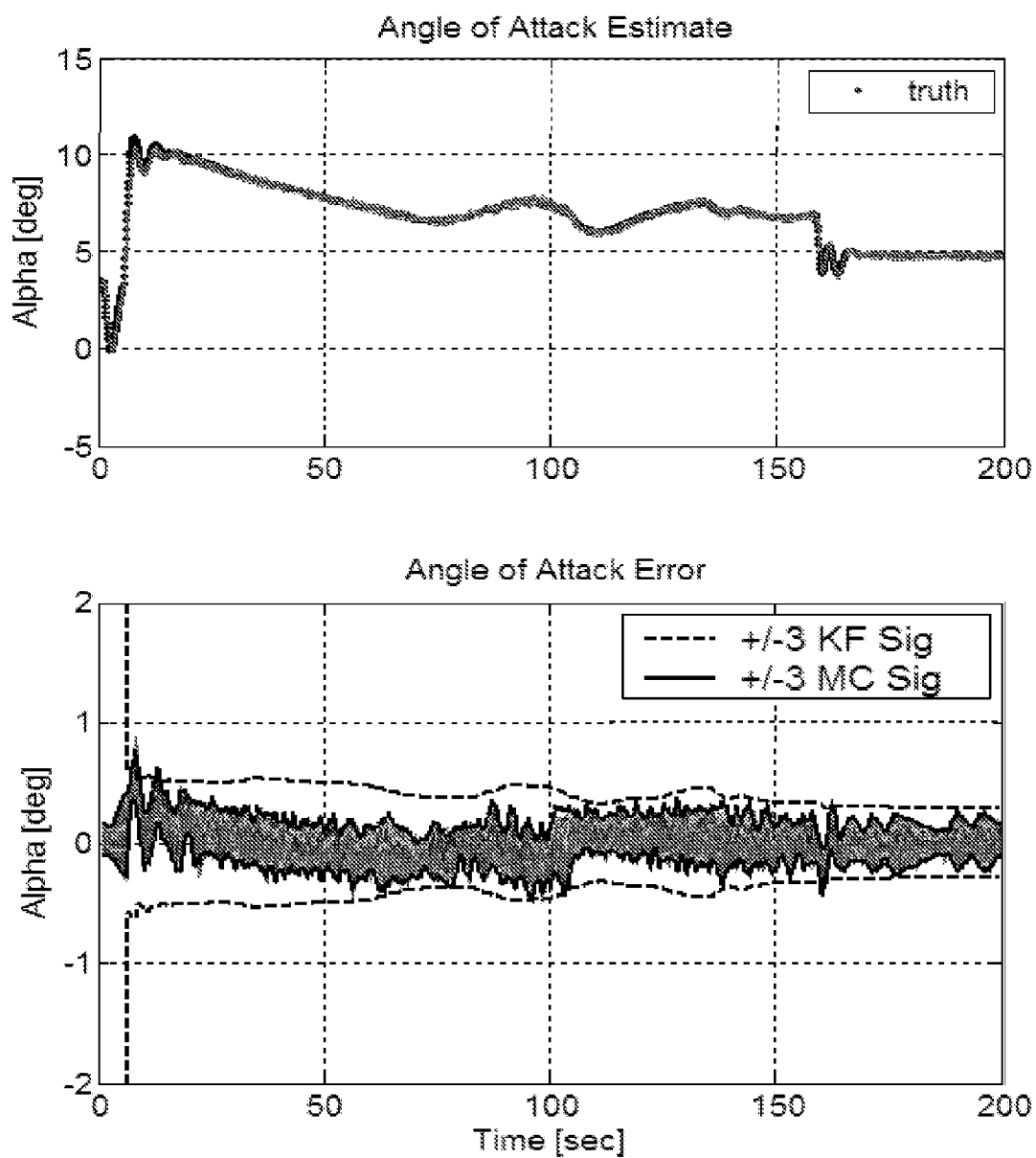
FIG. 5 shows predicted angle of attack and associated prediction uncertainties as determined in accordance with an embodiment of the invention.
Figure 6:
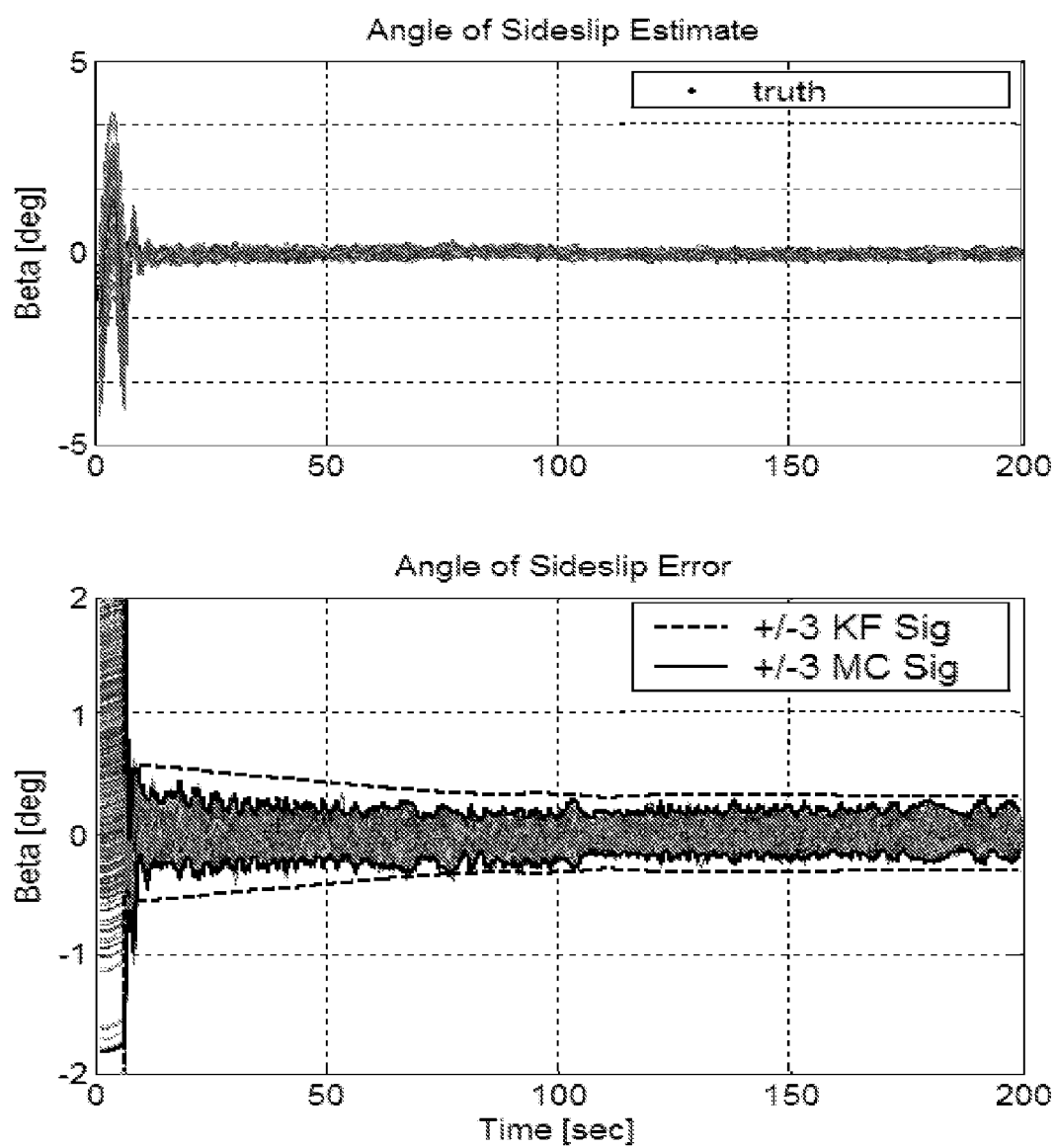
FIG. 6 shows predicted side-slip angle and associated prediction uncertainties as determined in accordance with an embodiment of the invention.
Figure 7:
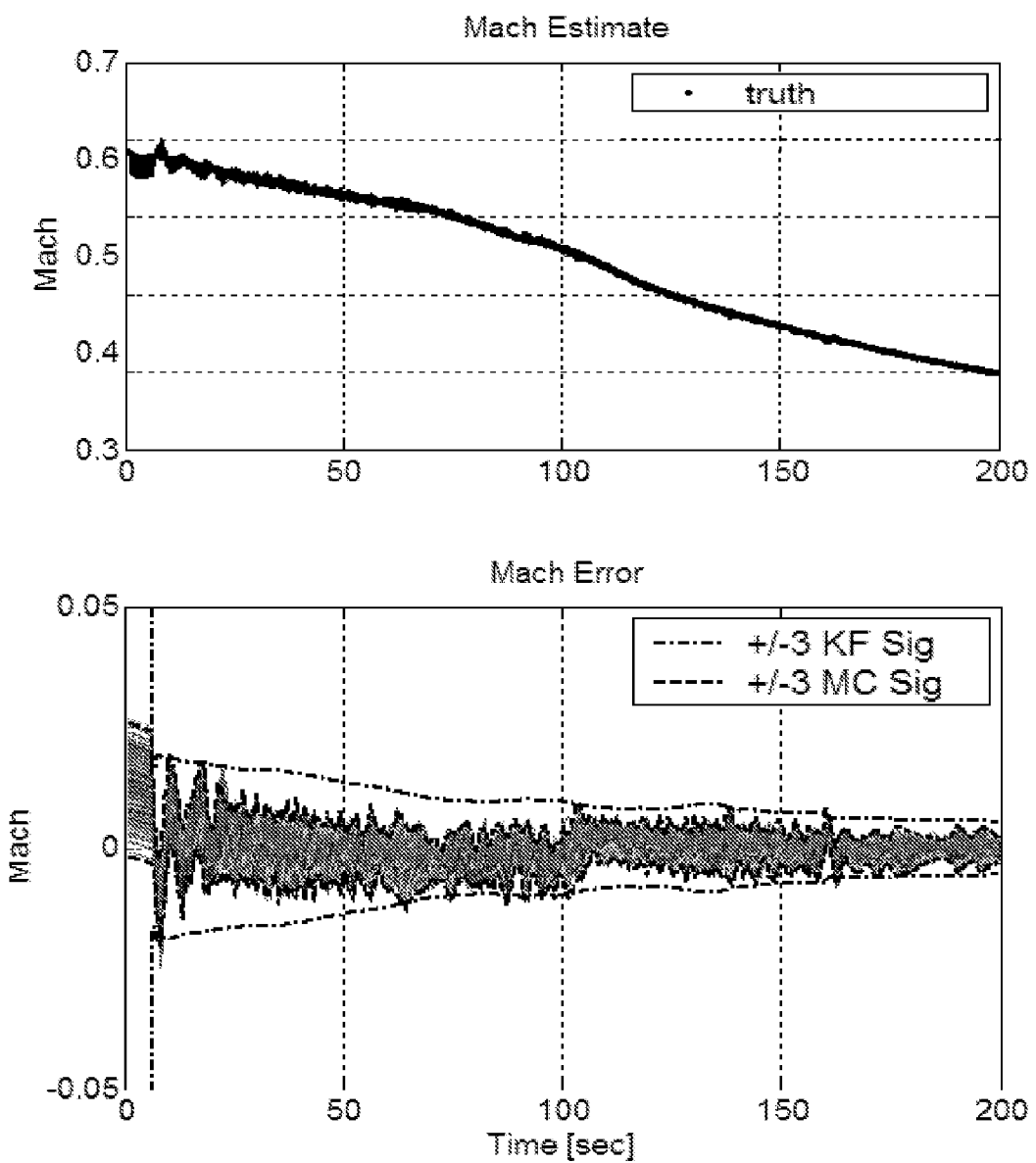
FIG. 7 shows predicted Mach number and associated prediction uncertainties as determined in accordance with an embodiment of the invention.

Simulations have been conducted to assess the feasibility of embodiments of the methods and systems in accordance with the present disclosure. For example, FIGS. 5, 6, and 7 show predicted angle of attack 300, predicted side-slip angle 340, and predicted Mach number 380, and associated prediction uncertainties 320, 360, 400, as determined in accordance with an embodiment of the invention using a 500 sample Monte Carlo simulation. The graphs of prediction uncertainties 320, 360, 400 suggest that the uncertainties between the predicted flight characteristics 300, 340, 380 and actual flight characteristics are generally very small and well-within acceptable limits.

Figure 8:
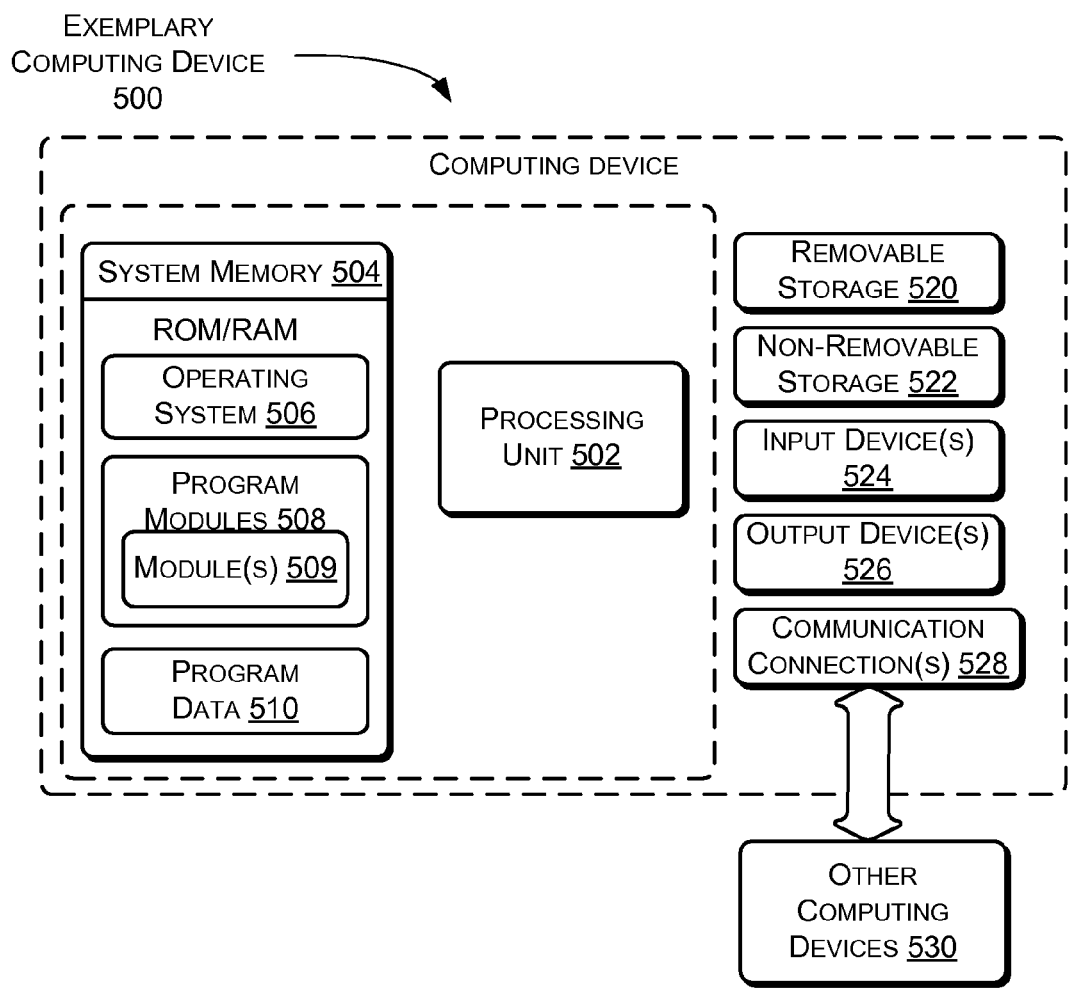
FIG. 8 is a schematic view of a computing device configured in accordance with an embodiment of the invention.

FIG. 8 illustrates a computing device 500 configured in accordance with an embodiment of the present invention. The computing device 500 may be used, for example, as one or more of the processors 118 of the air data system 110 of FIGS. 1-3, or as one or more of the components of the processing portion 130 shown in FIG. 4. In a basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For the present methods of calculating air data, the program modules 508 may include the process modules 509 that realize one or more the processes described herein. Other modules described herein may also be part of the program modules 508. As an alternative, process modules 509, as well as the other modules, may be implemented as part of the operating system 506, or it may be installed on the computing device and stored in other memory (e.g., non-removable storage 522) separate from the system memory 504.

The computing device 500 may have additional features or functionality. For example, the computing device 500 may also include additional data storage devices (removable and/or non-removable) such as, for example, magnetic disks, optical disks, or tape. Such additional storage is illustrated in FIG. 8 by removable storage 520 and non-removable storage 522. Computer storage media may include volatile and nonvolatile, removable and non-removable media implemented in any method or technology for storage of information, such as computer readable instructions, data structures, program modules, or other data. The system memory 504, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well know in the art and need not be discussed at length.

The computing device 500 may also contain a communication connection 528 that allow the device to communicate with other computing devices 530, such as over a network. The other computing devices 530 may include, for example, devices associated with control and guidance of a flight vehicle. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Embodiments of methods and systems in accordance with the invention may provide significant advantages over the prior art. For example, as noted above, due to the redundancy of the air data system 110, the air data may be available even in the event of a pressure measurement failure. Embodiments of the invention may use measurements from any number of pressure measurement sources and may provide a graceful transition to an INS air data solution in the event of loss of all pressure measurements. This may be accomplished by using an Extended Kalman filter (EKF) to estimate and track properties of the local atmosphere. Atmospheric properties typically change much more slowly than the air data parameters themselves, and therefore are relatively easy to track. Once the atmospheric properties are estimated they are combined with INS velocity and attitude to provide the desired state vector 164 of vehicle air data.

In addition, embodiments of the invention allow a solution for air data parameter estimation without requiring invasive probes, disruption of the surface outer mold line, or pressure taps on the nose of the vehicle. These advantages are more pronounced for smaller vehicles, for which volume is a minimum, and for high velocity atmospheric reentry vehicles, where surface temperatures during reentry are very high at the nose. Thus, embodiments of the invention may advantageously eliminate the need for expensive, bulky and mechanically deployable air data probes. And by using both inertial measurements and pressure measurements, embodiments of the invention may provide a complete air data solution with flexibility in the location of the pressure taps, redundancy management of the measurements, and the ability to operate in the absence of pressure measurements.

Embodiments of the invention take advantage of the relatively higher processing power of modern flight computers to calculate the measurement estimates needed to form the EKF observations. The high sensitivity of these particular observations to perturbations in the local atmospheric properties is what gives embodiments of the invention the ability to track the vehicle's air data parameters. Because air data systems and methods in accordance with the invention are designed to estimate the relatively slow varying atmospheric parameters, such embodiments can run at a relatively low rate, which mitigates the higher processing power required to calculate the EKF observations.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of calculating air data used for controlling an aircraft, comprising:
   acquiring one or more pressure measurements at locations on an outer surface of the aircraft;
   acquiring one or more measurements using an alternate navigation device;
   computing an indicated air data solution using the one or more measurements obtained using the alternate navigation device and an atmospheric model;

computing corrections to the indicated air data solution using one or more other measured parameters, wherein the one or more other measured parameters include at least one of the one or more pressure measurements and the one or more measurements obtained using the alternate navigation device;

determining a corrected air data solution using the indicated air data solution and the corrections; and providing the corrected air data solution for use in controlling the aircraft.

2. The method of claim 1, wherein acquiring one or more measurements using an alternate navigation device includes acquiring one or more measurements using at least one of an inertial navigation system, and a global positioning system aided inertial navigation system.

3. The method of claim 1, wherein computing corrections to the indicated air data solution using one or more other measured parameters includes computing corrections to the indicated air data solution using one or more other measured parameters acquired using at least one of an inertial navigation system, and a global positioning system aided inertial navigation system.

4. The method of claim 1, wherein computing corrections to the indicated air data solution using one or more other measured parameters includes computing corrections to the indicated air data solution using an extended Kalman filter configured to receive the one or more pressure measurements and the one or more other measured parameters and to compute corrections to the indicated air data solution.

5. The method of claim 1, wherein computing an indicated air data solution includes computing an indicated air data solution at a first frequency, and wherein computing corrections to the indicated air data solution includes computing corrections to the indicated air data solution at a second frequency, the second frequency being equal to or less than the first frequency.

6. The method of claim 1, wherein computing an indicated air data solution includes computing an indicated air data solution at a first frequency, and wherein computing corrections to the indicated air data solution includes computing corrections to the indicated air data solution at a second frequency, the second frequency being different than the first frequency.

7. The method of claim 1, wherein acquiring one or more pressure measurements at locations on an outer surface of the aircraft includes acquiring at least one pressure measurement on a lateral surface of the aircraft and acquiring at least one pressure measurement on a surface other than the lateral surface of the aircraft.

8. The method of claim 1, wherein acquiring one or more pressure measurements includes acquiring one or more pressure measurements at one or more locations, the one or more locations being at least one of located at and spaced apart from a stagnation point on the aircraft using one or more non-protruding pressure measurement devices.

9. The method of claim 1, wherein acquiring one or more measurements using an alternate navigation device includes:

providing a first set of measurements to a first component configured to determine a first set of flight characteristics, the first set of flight characteristics being used in computing the indicated air data solution; and providing a second set of measurements to a second component configured to determine a second set of flight characteristics, the second set of flight characteristics being used in computing corrections to the indicated air data solution.

10. The method of claim 9, wherein computing corrections to the indicated air data solution includes computing corrections to the indicated air data solution using an extended Kalman filter configured to receive the one or more pressure measurements and the second set of flight characteristics and to compute corrections to the indicated air data solution.

11. A system for calculating air data used for controlling an aircraft, comprising:

a data acquisition component including first portion configured to acquire one or more pressure measurements at locations on an outer surface of the aircraft, and a second portion configured to acquire one or more measurements using an alternate navigation device; and a processing component configured to receive the measurements from the data acquisition component, and further configured to:

compute an indicated air data solution using the one or more measurements obtained using the alternate navigation device and an atmospheric model;

compute corrections to the indicated air data solution using one or more other measured parameters, wherein the one or more other measured parameters include at least one of the one or more pressure measurements and the one or more measurements obtained using the alternate navigation device;

determine a corrected air data solution using the indicated air data solution and the corrections; and provide the corrected air data solution for use in controlling the aircraft.

12. The system of claim 11, wherein the second portion of the data acquisition component is configured to acquire one or more measurements using at least one of an inertial navigation system, and a global positioning system aided inertial navigation system.

13. The system of claim 11, wherein the processing component is further configured to compute corrections to the indicated air data solution using an extended Kalman filter, the Kalman filter being configured to receive the one or more pressure measurements and the one or more other measured parameters and to compute corrections to the indicated air data solution.

14. The system of claim 11, wherein the processing component is further configured to compute an indicated air data solution at a first frequency, and to compute corrections to the indicated air data solution at a second frequency, the second frequency being equal to or less than the first frequency.

15. The system of claim 11, wherein the second portion of the data acquisition component is further configured to provide a first set of flight characteristics and a second set of flight characteristics, and wherein the processing component is further configured to compute the indicated air data solution using the first set of flight characteristics, and to compute corrections to the indicated air data solution using the second set of flight characteristics.

16. One or more computer-readable media comprising computer executable instructions that, when executed, perform a method comprising:

computing an indicated air data solution using one or more measurements obtained using a navigation device and an atmospheric model;

computing corrections to the indicated air data solution using one or more other measured parameters, wherein the one or more other measured parameters include at least one of one or more pressure measurements and the one or more measurements obtained using the alternate navigation device;

determining a corrected air data solution using the indicated air data solution and the corrections; and providing the corrected air data solution for use in controlling an aircraft.

17. The one or more computer-readable media of claim 16, wherein computing corrections to the indicated air data solution using one or more other measured parameters includes computing corrections to the indicated air data solution using one or more other measured parameters acquired using at least one of an inertial navigation system, and a global positioning system aided inertial navigation system.

18. The one or more computer-readable media of claim 16, wherein computing corrections to the indicated air data solution includes computing corrections to the indicated air data solution using an extended Kalman filter, the Kalman filter being configured to receive the one or more pressure measurements and the one or more other measured parameters and to compute corrections to the indicated air data solution.

19. The one or more computer-readable media of claim 16, wherein computing an indicated air data solution includes computing an indicated air data solution at a first frequency, and wherein computing corrections to the indicated air data solution includes computing corrections to the indicated air data solution at a second frequency, the second frequency being equal to or less than the first frequency.

20. The one or more computer-readable media of claim 16, wherein the method further comprises acquiring the one or more pressure measurements; and acquiring the one or more other measured parameters, including a first set of flight characteristics and a second set of flight characteristics; and wherein computing an indicated air data solution includes computing an indicated air data solution using the first set of flight characteristics; and computing corrections to the indicated air data solution includes computing corrections to the indicated air data solution using the second set of flight characteristics.

* * * * *